United States Patent

[11] 3,595,265

| [72] | Inventors | John R. Cryder;<br>William B. Norick, both of Joliet, Ill. |
|---|---|---|
| [21] | Appl. No. | 815,545 |
| [22] | Filed | Apr. 14, 1969 |
| [45] | Patented | July 27, 1971 |
| [73] | Assignee | Caterpillar Tractor Co.<br>Peoria, Ill. |

[54] SELF-CLEANING ORIFICE CHECK VALVE
1 Claim, 4 Drawing Figs.

[52] U.S. Cl. .................................................... 137/513.5
[51] Int. Cl. .................................................. F16k 15/02,
F16k 21/02
[50] Field of Search ........................................... 137/513.5

[56] References Cited
UNITED STATES PATENTS
| 879,029 | 2/1908 | Blackburn | 137/513.5 |
| 2,111,991 | 3/1938 | Richard | 137/513.5 |
| 2,310,636 | 2/1943 | Howard | 137/513.5 |
| 3,181,561 | 5/1965 | Schaller | 137/513.5 |
| 3,431,028 | 3/1969 | Yoder | 137/513.5 |
| 3,200,830 | 8/1965 | Moyer | 137/513.5 |

Primary Examiner—Laverne D. Geiger
Assistant Examiner—William H. Wright
Attorney—Fryer, Tjensvold, Feix, Phillips & Lempio ABSTRACT: A check valve that has an orifice formed by a groove in its face which communicates with the upstream and downstream sides of the valve so as to allow restricted flow through the valve when it is closed, and wherein upon opening of the check valve, foreign material which may have lodged in the orifice is flushed out by the fluid flowing through the valve.

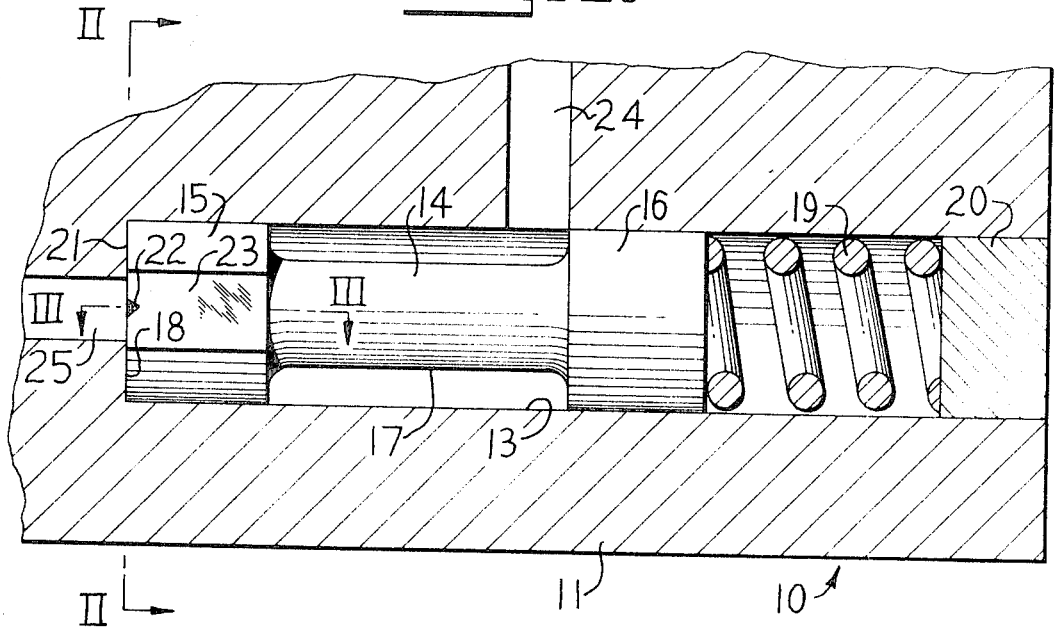
Fig_1.
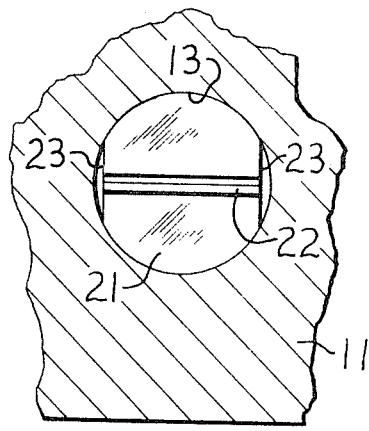
Fig_2.
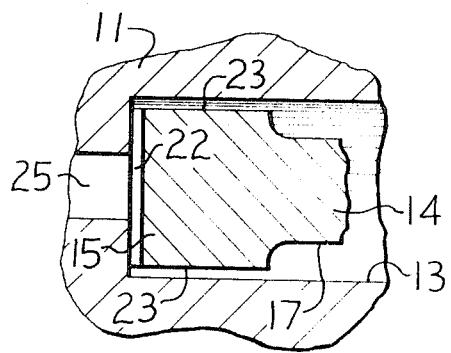
Fig_3.
INVENTORS
JOHN R. CRYDER
WILLIAM B. NORICK
BY
ATTORNEYS

SELF-CLEANING ORIFICE CHECK VALVE

BACKGROUND OF THE INVENTION

This invention relates to the field of orifice-type check valves which allow restricted flow of fluid through the valve when the valve is "closed." Such valves are employed where it is desired to provide free flow of fluid in one direction when the valve is open, and restricted flow of fluid in the other direction when the valve is closed.

Prior to this invention, orifice-type check valves have been commonly made by drilling a hole through the valve spool or element, whereby fluid is allowed to flow in a restricted manner through the valve when the valve is closed. However, when the orifice size is desired to be quite small, the hole is susceptible to plugging caused by small foreign particles in the fluid.

The object of this invention is to provide an orifice check valve that will periodically clean its orifice of any foreign particles that may be lodged therein. This is effected by providing a groove or slot in the valve face, extending across the area of the valve face that engages the valve seat when the valve is closed.

Thus, when the fluid pressure behind the valve is greater than the fluid pressure in front of the valve, a restricted amount of fluid is allowed to flow through the valve. When the fluid pressure in front of the valve is greater than the pressure behind the valve, depending upon the biasing of the valve, the valve will open and a large stream of fluid will flow through the valve. This large stream of fluid flowing past the face of the valve, and past the groove, that in cooperation with the valve seat, functions as an orifice when the valve is closed, flushes away any foreign particles of material that may have lodged therein when the valve was closed.

Further objects and advantages of the invention and the manner in which it is carried into practice will become apparent upon reading the following specifications, wherein reference is made to the accompanying drawings.

In the drawings:

FIG. 1 is a central sectional view of a spool-type check valve embodying the present invention;

FIG. 2 is a fragmentary transverse section of the valve, taken along the line and in the direction indicated by the arrows II–II in FIG. 1;

FIG. 3 is a fragmentary section of the valve taken along the line and in the direction indicated by the arrows III–III in FIG. 1.

Figure 4:
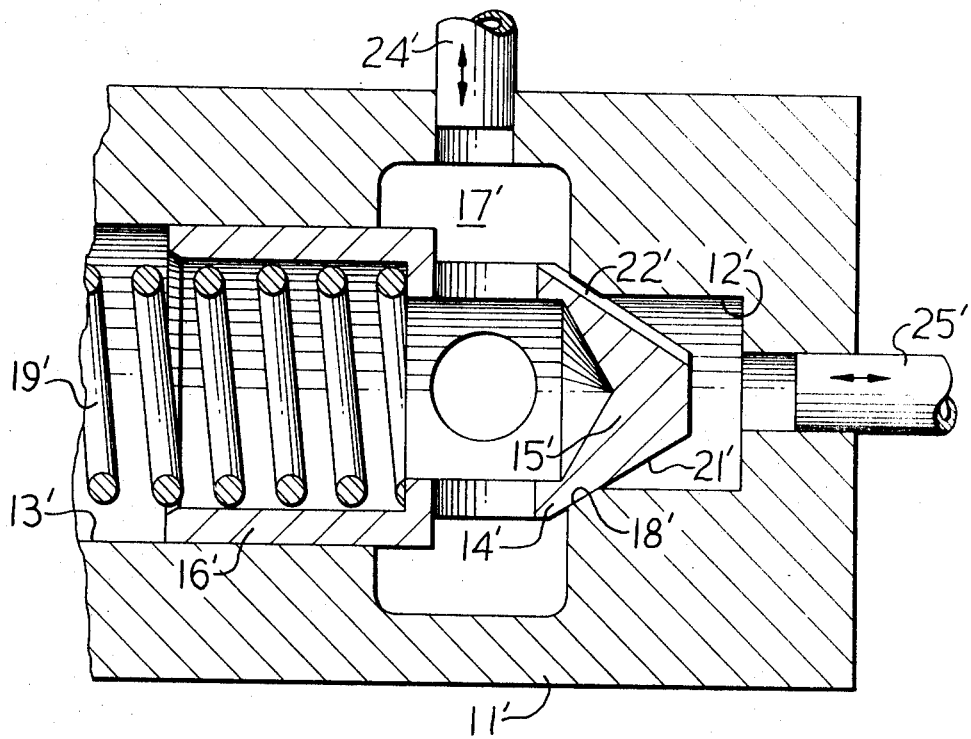
FIG. 4 is a central sectional view of another embodiment of this invention in a poppet-type check valve having a conical valve element and seat.

In FIG. 1 a spool-type check valve is shown generally at 10 and comprises a valve body 11 having a bore 13 within which a spool 14, having lands 15 and 16 and annular space 17, is slidably disposed and urged toward a valve seat 18 at the inner end of the bore 13 by a spring 19, compressed between the spool 14 and end plug 20 disposed in the outer end of the bore 13. Valve face 21 on the end of the valve spool 14 engages valve seat 18 when the valve is closed, and has a groove 22 extending across its end.

Land 15 of spool 14 has diametrically opposed flats 23 which extend across the width of land 15 and as seen in FIG. 3, provide clearance between land 15 and bore 13 to allow communication of fluid between groove 22 and annular space 17.

Passage 24 formed in valve body 11 communicates with bore 13, and registers with annular space 17 at all times. Passage 25 formed in the end of valve body 11 communicates with the end of bore 13 and groove 27 in the face of the valve.

When the fluid pressure in passage 24 is greater than the pressure in passage 25, a restricted stream of fluid will flow through passage 24, through annular space 17, through the passage formed by bore 13 and flats 23, through the orifice formed by groove 22 and valve seat 18 and out through passage 25.

When the fluid pressure in passage 25 is sufficiently high to overcome the force of spring 19, the valve opens and spool 14 is shifted toward the right. When the valve is open a large stream of fluid will flow through passage 25 and bore 13, through the passages formed by bore 13 and flats 23, through annular space 17 and out through passage 24. This large stream of fluid flowing through passage 25 washes across face 21 of the valve out along the direction of grooves 22 toward flats 23. This large flow of fluid along groove 22 flushes out any foreign material that may have lodged therein during the time when the valve was closed.

In FIG. 4 this invention is shown embodied in a poppet-type check valve having a conical valve face 21' and seat 18'. A valve body 11' has a bore 13' within which a valve element 14' is slidably disposed and urged towards valve seat 18' by a spring 19' which engages the valve element 14' within a spring cap 16' formed on one end of the valve element. A downstream passage 24' communicates with an annular groove 17' formed in valve body 11' behind valve seat 18'. A conical face 21' is formed on one end 15' of valve element 14' and has a groove 22' extending across the area of the face that engages the valve seat 18'. An upstream passage 25' communicates with a bore 12' formed in the valve body. When the fluid pressure in passage 24' is greater than the fluid pressure in passage 25', a restricted amount of fluid is allowed to flow through groove 22' formed in valve face 21'. When the fluid pressure in passage 25' is sufficient to overcome the force of spring 19', the valve will open and a large amount of fluid will flow through the valve. This large flow of fluid across the face of the valve will wash any particles out of groove 22' that may have become lodged there when the valve was closed.

I claim:

1. An orifice-type check valve for providing a restricted flow in a first direction and an unrestricted flow in a second direction opposite to the first direction comprising a valve body, a bore in the valve body, a seat provided at one end of the bore, a first conduit means for communicating fluid to said one end of the bore, a second conduit means intersecting the bore transversely therewith and at a point remote from said first conduit means, a valve element slidably disposed in the bore, said valve element comprising a spool having first and second spaced lands defining an annular recess therebetween on said spool and wherein said first land is disposed between the first and second conduit means, said annular recess continually communicating with the second conduit means, means urging the valve element against the seat producing parallel abutting surfaces disposed transversely relative to said first conduit means, at least one of said surfaces having a groove formed thereon to provide an orifice when the valve is closed, said groove being disposed in a position to be flushed by the flow of fluid through the valve when it is opened, said first land having flats on the periphery thereof communicating with the groove and the annular recess.